United States Patent
Natale et al.

(10) Patent No.: US 11,198,798 B2
(45) Date of Patent: Dec. 14, 2021

(54) SELF-FUSING SILICONE TAPE COMPOSITIONS HAVING CORROSION INHIBITORS THEREIN

(71) Applicant: NORTHERN TECHNOLOGIES INTERNATIONAL CORPORATION, Beachwood, OH (US)

(72) Inventors: Terry Alan Natale, Hudson, OH (US); Ronnie do Amaral Singh, Sorocaba (BR); Edwardo Yoshihiro Tanabe, Sao Roque (BR)

(73) Assignee: Northern Technologies International Corporation, Circle Pines, MN (US)

( * ) Notice: Subject to any disclaimer, the term of this patent is extended or adjusted under 35 U.S.C. 154(b) by 0 days.

(21) Appl. No.: 16/647,699

(22) PCT Filed: Oct. 4, 2018

(86) PCT No.: PCT/US2018/054284
§ 371 (c)(1),
(2) Date: Mar. 16, 2020

(87) PCT Pub. No.: WO2019/070927
PCT Pub. Date: Apr. 11, 2019

(65) Prior Publication Data
US 2020/0277516 A1    Sep. 3, 2020

Related U.S. Application Data

(60) Provisional application No. 62/569,067, filed on Oct. 6, 2017.

(51) Int. Cl.
*C09J 7/00* (2018.01)
*C09J 7/10* (2018.01)
(Continued)

(52) U.S. Cl.
CPC ............... *C09J 7/10* (2018.01); *C08G 77/20* (2013.01); *C09D 5/084* (2013.01); *C09D 7/61* (2018.01);
(Continued)

(58) Field of Classification Search
None
See application file for complete search history.

(56) References Cited

U.S. PATENT DOCUMENTS 3,006,463 A   10/1961   Bond et al.
3,161,533 A   12/1964   Gaynes
(Continued)

FOREIGN PATENT DOCUMENTS

CN   104479578 B  *  5/2016
CN   104479578 B     5/2016
(Continued)

OTHER PUBLICATIONS

CN 104479578—English translation (Year: 2016).*

*Primary Examiner* — Stefanie J Cohen
(74) *Attorney, Agent, or Firm* — Hudak, Shunk & Farine Co. LPA

(57) ABSTRACT

Self-fusing silicone tapes contain neutral corrosion inhibitors therein such as salts of acids. Such tapes provide protection in an acid gas environment as well as under thermal insulation. The same also allows inspection of protected structure without removing the protection apparatus.

14 Claims, 2 Drawing Sheets

(51) Int. Cl.
*C09D 7/61* (2018.01)
*C08G 77/20* (2006.01)
*C09D 5/08* (2006.01)
*C09D 183/06* (2006.01)
*C08K 5/098* (2006.01)

(52) U.S. Cl.
CPC ............ *C09D 183/06* (2013.01); *C08K 5/098* (2013.01); *C09J 2301/408* (2020.08); *C09J 2483/00* (2013.01)

(56) References Cited

U.S. PATENT DOCUMENTS

| | | | |
|---|---|---|---|
| 3,379,562 A | 4/1968 | Freeman | |
| 3,470,127 A | 9/1969 | Snell et al. | |
| 3,684,644 A | 8/1972 | Snell | |
| 4,999,134 A | 3/1991 | Liedek et al. | |
| 5,674,630 A * | 10/1997 | Chatterjee | C08L 23/12 |
| | | | 428/500 |
| 5,807,507 A * | 9/1998 | Hirano | C08K 3/04 |
| | | | 252/511 |
| 6,417,263 B1 | 7/2002 | DeGroot, Jr. et al. | |
| 6,727,300 B2 * | 4/2004 | Sassi | C07D 211/46 |
| | | | 524/103 |
| 9,593,275 B2 | 3/2017 | Tang et al. | |
| 2007/0264510 A1 * | 11/2007 | Fehn | C08L 83/04 |
| | | | 428/447 |
| 2009/0081107 A1 * | 3/2009 | Abbott | E04H 12/2292 |
| | | | 423/348 |
| 2012/0003598 A1 | 1/2012 | Mussig et al. | |
| 2012/0141754 A1 * | 6/2012 | Kubik | B32B 27/00 |
| | | | 428/213 |
| 2013/0095300 A1 | 4/2013 | Hatje et al. | |
| 2017/0102337 A1 * | 4/2017 | Benson | G01N 33/0044 |

FOREIGN PATENT DOCUMENTS

| | | | | |
|---|---|---|---|---|
| EP | 1233014 A1 * | 8/2002 | ............... | C08K 5/14 |
| KR | 20090028751 A | 3/2009 | | |
| WO | 2016105501 A1 | 6/2016 | | |

* cited by examiner

SELF-FUSING SILICONE TAPE COMPOSITIONS HAVING CORROSION INHIBITORS THEREIN

FIELD OF THE INVENTION

The present invention relates to one or more neutral corrosion inhibitors that are added and mixed with a self-fusing silicone tape composition that can be applied to an article. Self-fusing silicone tapes are defined as tapes that can be wrapped around itself and upon passage of time will bind to itself and become a single or integral article. That is a continuous, solid, flexible mass. The formulations of self-fusing silicone tapes are generally a trade secret but it is known to the art and the literature that they are generally made from at least one or more polysiloxanes, a crosslinking agent, and a fusion additive package that promotes fusion into a single homogeneous mass without the application of heat. Such self-fusing silicone tapes are suited for aggressive environments such as chemical plants, refineries, off-shore platforms, pipe joints, pipe flanges, and the like.

BACKGROUND OF THE INVENTION

Heretofore, it has been difficult to protect certain articles having irregular geometry, such as various flange joints, or heated metallic pipes, vessels, etc., having thermal insulation thereon. Petrolatum tapes generally are messy, and they can create voids that can collect, trap, etc., humidity, condensation, or rain. Such irregular geometry flange joints that exist at non-ambient temperatures such as about 80° C. or higher when treated with Petrolatum tapes have a maximum surface temperature protection of only about 110° C., and inspection of the joint cannot occur without removing the tape. Shrink sleeves require a source of heat to shrink the same, and may not make a good seal as well as allow ingress of water. Moreover, they cannot be inspected without removal of the shrink film that is difficult, will work only for certain geometries, and generally only protect by a barrier mechanism. Wax fillers have been used but the same are generally messy, time consuming with regard to the application thereof, and can shrink over time and create voids that subsequently can trap water. They too, work only by a barrier mechanism, are difficult to remove, and the article cannot be inspected without removal of the filler.

Other areas of irregular geometry flange joints are flange bands and protective caps. Caps can leak allowing water ingress, and grease must be removed to permit inspection and the protection is by barrier mechanism only.

While silicone tapes per se have been utilized, the same may create voids that trap humidity, condensation, or rain, are ineffective in an acid gas environment and also work by barrier mechanism only.

Still a further shortcoming of the prior art is heated metallic joints such as pipes and vessels that have thermal insulation, often absorb water and thus promote corrosion.

U.S. Pat. No. 3,006,463 issued Oct. 31, 1961, relates to a blend including a silicone gum polymer, a silicone resin, and a particular type of filler. The blended ingredients are subjected to brief cure conditions, and to accomplish this a curing agent is usually included in the blend. The particular type of filler employed is critical as is the type of curing agent.

U.S. Pat. No. 3,161,533 issued Dec. 15, 1964 relates to a tape structure formed by coating one surface of a flat web of heat-resistant material with a special silicone rubber composition, curing the composition, thereafter applying a layer of a special pressure-sensitive adhesive formulation to the opposite surface thereof, and heat treating both the composition and the formulation in a manner as set forth in patent.

U.S. Pat. No. 3,379,562 issued Apr. 23, 1968, relates to a self-adhering tape carrying a thin substantially non-tacky substantially continuous barrier layer on one surface that prevents the convolutions of the tape in a storage roll from adhering. The barrier layer separates into small particles when the tape is stretched during application, so as to permit adhesion between adjacent convolutions.

U.S. Pat. No. 3,470,127 issued Sep. 30, 1968, relates to a self-fusing electrical insulating tape comprising an ethylene-propylene elastomer, a tackifier, and either a thermoplastic resin selected from polyethylene or polypropylene or a curing agent. In some embodiments an elastomer based on isobutylene, a plasticizer, and fillers, including electrically conductive fillers, are also included.

U.S. Pat. No. 3,684,644 issued Aug. 15, 1972, relates to self-fusing tapes that form an insulating sheath having high resistance to penetration by moisture and that have self-fusing properties and immediate adhesion to conductor and insulation surfaces. The tape comprises a self-fusing base sheet based on elastomers and resinous tackifiers and a layer of rubber-resin pressure-sensitive adhesive coated on the base sheet.

U.S. Pat. No. 5,807,507 issued Sep. 15, 1998, relates to adding an additive containing boron to a silicone rubber composition whereby a self-fusing conductive silicone rubber composition is provided, that can be tightly fused without adhesive processing of the tape's surface, can shield electromagnetic waves, prevent static electricity, and thus prevents damage. The silicone rubber composition comprises 100 parts by weight of a high polymerization degree organopolysiloxane, more than 0 but not more than 100 parts by weight of a reinforcement silica powder with a relative surface area of at least 50 $m^2/g$, more than 0 but not more than 100 parts by weight of an increased weight quasi-reinforcement filling agent with a relative surface area of at least 2 $m^2/g$, at least one conducting component selected from the group consisting of more than 10 but not more than 150 parts by weight of carbon black and more than 1 but not more than 400 parts by weight of a metal powder, between 0.1 and 10 parts by weight of a platinum catalyst and a crosslinking agent or an organic peroxide and more than 0.1 but not more than 20 parts by weight of an additive, and adjusting the proportion of boron and silicon atoms so that there are at least 1.0 boron atoms for 500 silicon atoms and there are not more than 1.0 boron atoms for 100 silicon atoms.

U.S. Pat. No. 9,593,275 issued Mar. 14, 2017 relates to an in situ method for forming a thermally conductive radical cure silicone composition. The in situ method comprises forming a thermally conductive clustered functional polymer comprising the reaction product of a reaction of a polyorganosiloxane having an average, per molecule, of at least 2 aliphatically unsaturated organic groups; a polyorganohydrogensiloxane having an average of 4 to 15 silicon atoms per molecule; and a reactive species having, per molecule, at least 1 aliphatically unsaturated organic group and 1 or more curable groups; in the presence of a filler treating agent, a filler comprising a thermally conductive filler, an isomer reducing agent, and a hydrosilylation catalyst. The method further comprises blending the thermally conductive clustered functional polymer with a radical initiator.

US Pub. 2009/0081107 A1 published Mar. 26, 2009 relates to utilization of self-fusing silicone to create a continuous protective barrier for wood or composite poles, posts, or similar structures. The insulating properties of silicone will provide some fire protection, while the self-fusing characteristic of the material supposedly create a completely sealed barrier. This protective silicone layer may be used over a primary layer with different properties to achieve a barrier with more target specific characteristics.

US Pub. 2013/0095300 A1 published Apr. 18, 2013 relates to a tape product including two opposing elongated strips of silicone, and interposed therein a carbon fiber thread having a transverse spatial pattern such that the thread increases the tear resistance while maintaining the elastic limit of the strips of self-fusing tape.

SUMMARY OF THE INVENTION

The present invention utilizing self-fusing silicone tapes containing one or more neutral corrosion inhibitors therein have been found to provide corrosion protection in an acid gas environment, provide corrosion protection of thermal insulated articles, and allow inspection of the irregular geometry of flange joints, etc., without removal of the protection apparatus. The installation and removal of the self-fusing silicone tape containing corrosion inhibitors is easy, is not messy, does not require a heat source during installation, is readily applicable to high temperature environments, and is adaptable to multiple geometries.

A corrosion resistant self-fusing silicone tape composition, comprises a self-fusing silicone composition, and from about 0.1 to about 25 parts by weight of a neutral corrosion inhibitor for every 100 parts by weight of said self-fusing silicone composition, said neutral corrosion inhibitor comprising a salt of a phosphoric acid, a salt of a gluconic acid, a salt of a carboxylic acid, a salt of benzoic acid, or an aluminum magnesium carbonate hydroxide (hydrate), or any combination thereof.

DETAILED DESCRIPTION OF THE INVENTION

Figure 1:
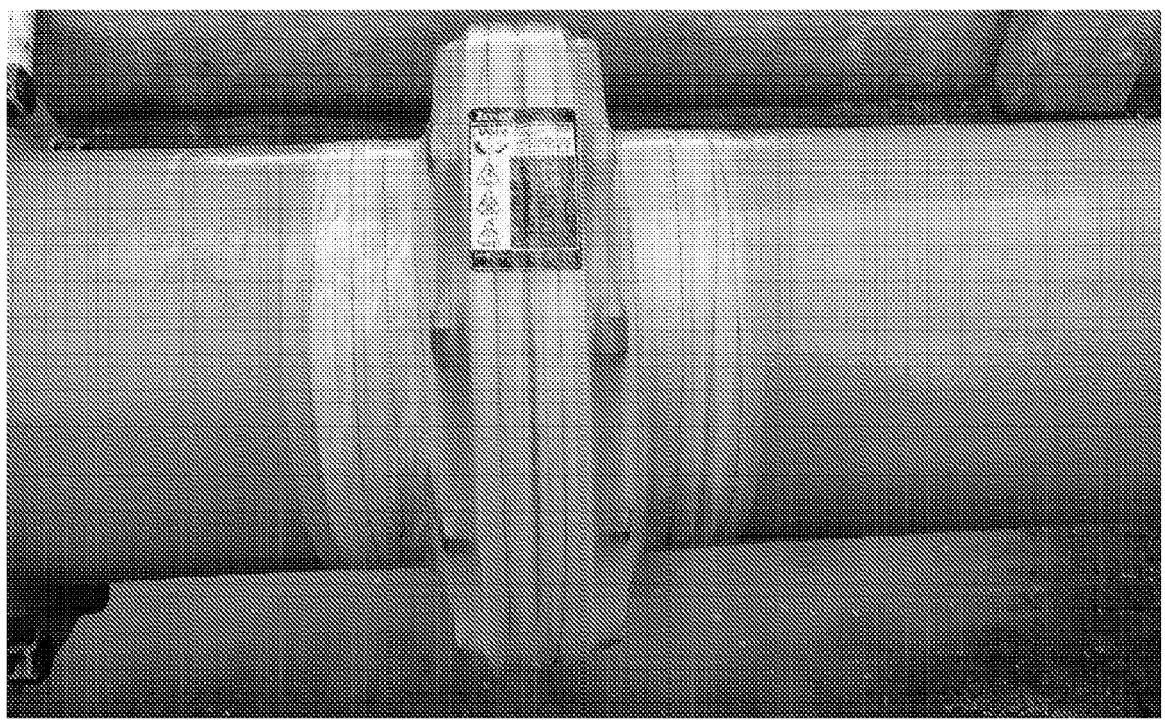
FIG. 1 is a side elevation photo view of a pipe flange joint covered with the self-fusing silicone tape of the present invention that permits visual inspection and provides protection of the flange joint in an aggressive environment, where aggressive refers to the presence of acidic gases such as sulfur dioxide and hydrogen sulfide.

Self-fusing silicone tape compositions are generally commercially available to the art and to the literature. They are generally made from at least a polysiloxane, a fusion additive package, and a crosslinking agent. They do not adhere to items such as plastic or metal, but rather only fuse to itself and upon time become an integral, flexible mass. Self-fusing silicone tapes are available from LOCTITE of Henkel AG of Germany; Nashua from Home Depot, F4 from Harbor Products, Inc.; Scotch 70 Self-Fusing Silicon Rubber Electrical Tape from 3M; Rust-Oleum 276714 Self-Fusing Silicone Tape from Rust-Oleum; Wrap-fix from Duck brand; 82112 Self-fusing silicone Tape from Permatex; Self-fusing Silicone Tape from Devcon; Arlon SFT from Arlon; and Miracle Wrap Tommy Tape and MSP Industrial Wrap from Midsun Specialty Products. The contents of such self-fusing tapes are generally trade secrets and are generally not known to the art. However, it is known that the Permatex 82112 does contain methyl vinyl silicone gum in an amount of from about 60 to about 100 wt. % and that the 3M Scotch 70 tapes contain cured silicone rubber in an amount of from about 90 to about 100 wt. % and amorphous silica in an amount of about 30 or less wt. %. The Midsun self-fusing tape contains DBP polyorganosiloxane in an amount of about 1 wt. % or less and dicumyl peroxide in an amount of about 1 wt. % or less.

An important aspect of the present invention is the use of one or more neutral corrosion inhibitors that are mixed with the above-noted self-fusing silicone tape compositions. Such corrosion inhibitors are generally water soluble since the solubility of the inhibitor can aid in transfer of the inhibitor to a metal surface, via moisture, of the part or item to be protected. It is believed that a polysiloxane is, of course, a polymer that has a —Si—O— backbone. Accordingly, it is believed that one or more of the following types of polysiloxanes are utilized in the above-noted commercial self-fusing silicone tapes, FMQ—silicone rubber having both methyl and fluorine substituent groups on the polymer chain, FVMQ—silicone rubber having fluorine, vinyl and methyl substituent groups on the polymer chain, PMQ—silicone rubber having both methyl and phenyl substituent groups on the polymer chain, PVMQ—silicone rubber having methyl, phenyl and vinyl substituent groups on the polymer chain, MQ—silicone rubber having only methyl substituent groups on the polymer chain (dimethyl polysiloxane), or VMQ—silicone rubber having both vinyl and methyl substituent groups on the polymer chain, PO— having phenyl methyl siloxane groups; or any combination of the one or more noted polysiloxanes.

Examples of neutral inorganic or organic corrosion inhibitors include salts of various organic and inorganic acids, such as phosphoric acid, gluconic acid, carboxylic acid, and benzoic acid. Examples of such salts include one or more of, sodium hexameta phosphate, calcium phosphate dibasic, sodium calcium polyphosphate, aluminum magnesium carbonate hydroxide (hydrate) sodium benzoate, calcium benzoate, or sodium gluconate, or any combination thereof. Generally, sodium benzoate is preferred.

The total amount of the one or more corrosion inhibitors can vary such as from about 0.1 to about 25, desirably from about 0.1 to about 10, and preferably from about 0.25 to about 3.5 parts by weight per every 100 parts by weight of said one or more self-fusing silicone compositions.

The corrosion inhibitor should have a particle size so that it can pass through a 100 mesh screen, i.e. less than 0.150 mm or less than 0.006 inches, preferably less than 120 mesh screen, i.e. less than 0.125 mm or less than 0.005 in. Larger particle sizes can have been found to result in reduced tensile strength, elongation and tear strength.

In order that suitable self-fusing silicone tapes are made, it is desirable that non-fusing compounds such as polymers or rubbers are not utilized since the tape will not fuse. It is noted that the silicone base resin is crosslinked to generally achieve polymeric mechanical properties, whereas the "fusion additive package" is what generally gives the unique ability of the material to form an integral unit when it comes into contact with itself, i.e. fuses together. That is, the self-fusing silicone tapes of the present invention are generally free of non-fusing compounds such as various non-polysiloxane polymers, e.g. copolymers as made from ethylene and propylene monomers such as EPDM copolymers, and so forth, and/or rubbers as made from dienes such as butadiene, isobutylene, or styrene. By the term "free of", it is meant that generally the amount of any such polymer and/or rubber compounds is about 5 parts by weight or less, desirably less than about 2.5 parts by weight, and preferably nil, that is no parts by weight whatsoever based upon 100 parts by weight of the one or more self-fusing silicone compositions.

As noted above, the self-fusing silicone compositions of the present invention comprise a polysiloxane, a fusion additive package, and a crosslinking agent. Upon mixing thereof, the polysiloxane becomes a self-fusing silicone. The crosslinking agents are generally a peroxide, as for example dicumyl peroxide, Di(2,4 dichlorobenzoyl) peroxide, benzoyl peroxide, 2,5 di(t-butylperoxy) 2,5-dimethylhexane, and any combination thereof, and the amount thereof is generally from about 0.1 to about 4 and desirably from about 0.5 to about 2.0 parts by weight per every 100 parts by weight of the one or more self-fusing polysiloxanes per se. The fusion additive package is a trade secret and the contents thereof were not found. Evidently, proprietary compounds are utilized that soften the polysiloxane and in combination with the crosslinking agent will form a self-fusing silicone composition that generally is utilized for making tapes. Such self-fusing silicone tape compositions are made by various manufacturers as set forth in a paragraph hereinabove.

An important aspect of the present invention is that the various corrosion inhibitors have a neutral pH as from about 5.5 to about 8.5, desirably from about 6 to about 8, and preferably from about 6.5 to about 7.5.

Thus, the corrosion of the inhibitors of the present invention are not alkaline since the same has been found to adversely affect the fusing mechanism of the self-fusing silicone compositions of the present invention. Alkaline corrosion inhibitors include sodium silicate, sodium dihydrogen phosphate, sodium hydrogen phosphate, sodium phosphate and sodium carbonate. If any such alkaline corrosion inhibitors are utilized, the amount thereof is such that the pH of the self-fusing silicon composition of the present invention is neutral. In other words, a self-fusing silicone tape composition of the present invention is generally free of alkaline inhibitors meaning that if utilized, the amount thereof is small, for example less than about 5 or about 1 part by weight, desirably less than about 0.5 or 0.1 part by weight, and preferably free thereof, that is nil or no parts by weight per every 100 parts by weight of the one or more self-fusing silicone compositions.

Another aspect is that water soluble corrosion inhibitors are desirable. Water solubility of the inhibitor can aid in transfer of the inhibitor to the metal surface via moisture. Thus, the self-fusing silicone tape composition of the present invention is substantially free of any insoluble salts. That is, the amount of any insoluble salts is generally low, for example about 10 parts by weight or less, desirably about 5 parts by weight or less, and preferably about 2 parts by weight or less or about 1 part by weight or less based upon 100 total parts of the self-fusing silicone tape composition of the present invention. Examples of insoluble salts include diammonium hetra phosphate, tetrapotassium diphosphate, various silicates such as zinc silicate, various vanadates such as sodium metavanadate, and various molybdates such as zinc molybdate.

The self-fusing silicone tape composition is made by utilizing typical silicone rubber processing techniques known to the literature and to the art. To prevent the silicone tape from adhering to itself, naturally, an interleaf, i.e. a non-adhesive layer or sheet, is installed between the layers of the roll of tape. The manufacturing process comprises the above-noted raw materials that are blended in either a mixer or on a roll mill. The final mixture will then either go to an extruder or to a calender. For the extruder, the final mixture is feed into the extruder, the extruder will force the material through a die that will give the material the proper finished shape. After exiting the die, the material will enter an oven to be cured. The cured product is then run through a water bath to cool it. Finally the cured tape is wound onto a spool with an interleaf to prevent sticking. For the calendered product, the same blended material from above is fed onto a calender. The calender sizes the material to the proper thickness and calenders the material onto a liner. A second liner is added to prevent blocking. After standing, the material has the second liner removed and it is fed into an oven for curing. The second liner is added back and the material is wound on a spool. The final step will be to slit the film to the final specified width.

The thickness of a tape made from the self-fusing silicone composition of the present invention can vary greatly depending upon the end use such as from about 5 to about 50 mils with from about 20 to about 30 mils being preferred. The width of the tape once again will vary as with respect to the type of end use and can generally vary over a broad range as from about 1 to about 39 inches.

Figure 2:
FIG. 2 is a side elevation photo view of an irregular pipe joint "T" flange showing the flange encapsulated with the self-fusing silicone tape of the present invention in an off-shore oil rig that permits visual inspection.

An example of installation and use of the tape such as shown in FIGS. 1 and 2 is as follows. For a typical flange joint, a narrow piece of silicone tape is wrapped around the flange joint and on both pipes of the flange close to the outer flange face, e.g. see FIG. 1. A wide piece of silicone tape is then wrapped around the outer diameter of the flange. Then several wraps of a narrow tape are placed at the intersection of the wide tape and the narrow pipe tapes. The tapes are applied under tension as to make a tighter bond to itself. The same procedure is also applicable to FIG. 2.

The tape was evaluated for its ability to protect a metal coupon in an aggressive environment as would typically be seen in the Oil and Gas industry, high humidity in the presence of $SO_2$ gas. In this case, that environment was simulated by exposure to an aqueous solution of sulfurous acid which generates $SO_2$ gas. The tape was evaluated in both direct and indirect contact with the metallic surface.

For direct contact, the metal coupon was completely enclosed in an "envelope" of silicone tape. That assembly was then hung from the top of a sealed container suspended over an aqueous solution of sulfurous acid. The sealed container was then aged at 50° C. for one day (24 hours). For indirect contact, a small frame is placed over the metal coupon such that there is a gap of approximately 8 mm between the metal coupon surface and the inner surface of the silicone tape. This is to simulate areas where there may be a small gap between the tape and the metal surface such as some surface of the nuts and bolts used to assemble a flanged joint. The test time was one day.

Two self-fusing silicone compositions were utilized in testing the corrosion resistance thereof when containing a corrosion inhibitor therein. The properties thereof are set forth in Table A.

TABLE A

| Property | Company A | Company B |
|---|---|---|
| Durometer (Shore A) | 50 | 50 |
| Tensile Strength (psi) | 1200 | 700 minimum |
| Dielectric Strength (V/mil) | 880 | 400 |

TABLE A-continued

| Property | Company A | Company B |
|---|---|---|
| Continuous Operating Temp | 180° C. | 260° C. |
| Elongation (%) | 600 | 300 minimum |

In accordance with the present invention, the corrosion inhibitor such as sodium benzoate, as set forth in amounts noted below as in Table 1 is added to the above-noted self-fusing silicone composition and mixed therewith before it was cured and subsequently made into the form of a rolled tape.

The self-infusing silicone tape compositions made by company A and company B were tested by mixing therein one part by weight of the noted corrosion inhibitor set forth in Table 1 and subjected to $SO_2$ gas by direct contact therewith for one day.

Table 1 sets forth the formulation of various self-fusing silicone compounds of the present invention.

TABLE 1

| | (parts by weight) | | | |
|---|---|---|---|---|
| Compound | Control | SB | SC | AM |
| Self-fusing silicone compound | 100* | 100* | 100* | 100* |
| Sodium benzoate (SB) | — | 1 | — | — |
| Sodium carbonate (SC) | — | — | 1 | — |
| Aluminum magnesium carbonate hydroxide (AM) | — | — | — | 1 |

*The self-fusing silicone compound was that of Company A.

The inhibitors of Table 1 were also evaluated for longer periods of time as set forth in Table II. A numerical rating was assigned based on the panel corrosion level: rating from 1-4, where 1 indicates a corrosion level of 0-10%, 2 indicates 11-49%, 3 indicates a corrosion level from 50-89% and 4 indicates a 90% or greater corrosion level.

TABLE II

| | Corrosion Ratings Days of Exposure | | | |
|---|---|---|---|---|
| | 1 | 4 | 7 | 12 |
| Sodium benzoate | 1 | 1 | 1 | 1 |
| Sodium carbonate | 1 | 1 | 1 | 1 |
| Aluminum magnesium carbonate hydroxide | 1 | 3 | 3 | 3 |
| Control (no inhibitor) | 4 | 4 | 4 | 4 |

A pilot production run was also made with sodium salt SB, SC and a 50/50 blend of the two inhibitors. The samples were evaluated after 14 days of exposure at 50° C., direct contact, SO2 atmosphere. A summary of the results is shown below in Table III.

TABLE III

| | Corrosion Rating |
|---|---|
| Sodium benzoate (SB) | 1 |
| Sodium carbonate (SC) | 1 |
| 50/50 blend SB/SC | 1 |
| Control (no inhibitor) | 4 |

The inhibitors of Table III were further compared to provide a relative ranking, (better to worst), The results were Sodium benzoate>50/50 blend SB/SC>Sodium carbonate The samples were also evaluated for indirect contact and the results are set forth in Table IV.

TABLE IV

| | Corrosion Rating |
|---|---|
| Sodium benzoate SB | 1 |
| Sodium carbonate SC | 1 |
| 50/50 blend SB/SC | 1 |
| Control (no inhibitor) | 3 |

The sodium benzoate inhibitor was evaluated in two different self-fusing silicone compositions from Company A and Company B, both direct contact and indirect contact. (Table V and VI)

TABLE V

| Direct contact: | | | | |
|---|---|---|---|---|
| | Corrosion Ratings Days of Exposure | | | |
| | 1 | 4 | 8 | 12 |
| Formulation A | 1 | 1 | 1 | 1 |
| Formulation B | 1 | 1 | 1 | 1 |
| Control (no inhibitor) | 4 | 4 | 4 | 4 |

TABLE VI

| Indirect contact: | | | | |
|---|---|---|---|---|
| | Corrosion Ratings Days of Exposure | | | |
| | 1 | 4 | 8 | 12 |
| Formulation A | 1 | 1 | 1 | 1 |
| Formulation B | 1 | 1 | 1 | 1 |
| Control (no inhibitor) | 4 | 4 | 4 | 4 |

Additional testing is also conducted with regard to corrosion under insulation (CUI). The test procedure for CUI was as follows:

Set-Up

A two-inch section of a 12-inch black iron pipe was taped off with masking tape;

The pipe was coated with red iron oxide primer and allowed to airdry for seven days The tape was removed to reveal a "bare" uncoated section The test pipe was wrapped with silicone tape A control pipe did not receive silicone tape The test pipe and control pipe were wrapped with 1" thick fiberglass insulation'

The insulation was held in place by several wraps of tape.

Exposure Cycle

During week days, the insulation wrapped pipes were immersed in tap water for approximately eight hours per day at ambient temperature.

The pipes were allowed to drain and then placed in a 80° C. oven overnight.

On weekends, the insulated pipes were either immersed in tap water at ambient or left in the 80° C. oven (alternating weekends) The exposure cycle was maintained for 25 days.

Evaluation

The insulation and silicone tape were removed from the pipes

Any loose/blistered paint was removed by gently scrapping the pipe with a soft plastic scrapper The coated and bare sections were visually evaluated for the amount of failure. For the coated section a failure was delamination of the coating. For the bare section, a failure was corrosion.

Results

|  | Estimated Failure % | |
| --- | --- | --- |
|  | Bare | Coated |
| Control | 70-80 | 30-40 |
| Test | 5-10 | 0 |

As apparent from the data, the tape of the present invention significantly reduced the amount of corrosion versus the control. However, it is noted that while sodium carbonate gave good results, it was found that over time that the sodium carbonate and 50/50 blends thereof lost their ability to fuse together.

The self-fusing silicone tape compositions of the present invention are suitable for corrosion aggressive environments such as chemical plants, refineries, off-shore platforms, and the like. They are specifically suited for protective joints or connections such as for pipes, both metal and polymer.

While in accordance with the patent statutes, the best mode and preferred embodiment have been set forth, the scope of the invention is not limited thereto, but rather by the scope of the attached claims.

What is claimed is:

1. A mixture, comprising: a self-fusing polysiloxane composition, and a non alkaline, water soluble neutral corrosion inhibitor, said self-fusing polysiloxane composition capable of being fused to itself and become an integral, flexible mass; from about 0.1 to about 25 parts by weight of said non alkaline, water soluble neutral corrosion inhibitor for every 100 parts by weight of said self-fusing polysiloxane composition, said non alkaline, water soluble neutral corrosion inhibitor comprising a salt of a phosphoric acid, a salt of a gluconic acid, a salt of a carboxylic acid, a salt of benzoic acid, or an aluminum magnesium carbonate hydroxide, or any combination thereof; wherein said corrosion inhibitors have a pH of from about 5.5 to about 8.5; wherein said water soluble neutral corrosion inhibitor is capable of being transferred to a metal surface via moisture, and wherein said self-fusing polysiloxane provides corrosion protection in an acid gas environment.

2. The mixture according to claim 1, wherein said self-fusing polysiloxane composition further comprises a cross-linking agent.

3. The mixture according to claim 2, wherein said polysiloxane is one or more of FMQ, FVMQ, PMQ, PVMQ, MQ, r VMQ, or any combination thereof, and wherein said corrosion inhibitors have a pH of from about 6.5 to about 7.5.

4. The mixture according to claim 1, wherein said non alkaline, water soluble corrosion inhibitor salts comprise sodium hexameta phosphate, calcium phosphate dibasic, sodium calcium polyphosphate, sodium benzoate, calcium benzoate, or sodium gluconate, or any combination thereof.

5. The mixture according to claim 4, wherein the amount of said non alkaline, water soluble corrosion inhibitor salt is from about 0.25 parts to about 10 parts by weight for every 100 parts by weight of said self-fusing polysiloxane composition.

6. The mixture according to claim 5, wherein the particle size of said non alkaline, water soluble corrosion inhibitor salt is less than about 0.006 inches; and wherein said corrosion inhibitors have a pH of from about 6 to about 8.

7. The mixture according to claim 4, wherein said non alkaline, water soluble corrosion inhibitor salt comprises sodium benzoate, and wherein the amount of said sodium benzoate is from about 0.25 parts to about 3.5 parts by weight for every 100 parts by weight of said self-fusing polysiloxane composition.

8. The mixture according to claim 7, wherein the particle size of said non alkaline, water soluble corrosion inhibitors is less than about 0.005 inches.

9. The mixture according to claim 4, wherein said non alkaline, water soluble corrosion inhibitor comprises sodium benzoate, wherein the amount of any alkaline corrosion inhibitor is about 1.0 part by weight or less for every 100 parts by weight of said self-fusing polysiloxane composition, and further comprising a metal surface, whereby said water solubility of said corrosion inhibitor aids in the transfer of said inhibitor to said metal surface.

10. The mixture according to claim 9, wherein the amount of any alkaline corrosion inhibitor is about 0.5 part by weight or less for every 100 parts by weight of said self-fusing polysiloxane composition, and wherein the amount of any non-fusing polymer, or rubber, or both, is about 2.5 parts by weight or less for every 100 parts by weight of said self-fusing polysiloxane composition.

11. The mixture according to claim 9, wherein the amount of any alkaline corrosion inhibitor is about 0.5 part by weight or less for every 100 parts by weight of said self-fusing polysiloxane composition.

12. The mixture according to claim 9, wherein the amount of any water insoluble salt is about 10 parts by weight or less per 100 parts by weight of said self-fusing silicone tape composition.

13. The mixture according to claim 9, wherein the amount of any water insoluble salt is about 5 parts by weight or less per 100 parts by weight of said self-fusing silicone tape composition.

14. The mixture according to claim 9, wherein the amount of any water insoluble salt is about 2 parts by weight or less per 100 parts by weight of said self-fusing silicone tape composition.

* * * * *